United States Patent [19]
Kornher et al.

[11] Patent Number: 5,745,088
[45] Date of Patent: Apr. 28, 1998

[54] TIME MULTIPLEXED ADDRESSING CIRCUITRY

[75] Inventors: Kevin L. Kornher, Dallas; James L. Conner, Rowlett; Claude E. Tew, Dallas; Hiep Van Tran, Carrollton; Joseph Harry Neal; Ngai Hung Hong, both of Sugar Land, all of Tex.

[73] Assignee: Texas Instruments Incorporated, Dallas, Tex.

[21] Appl. No.: 659,547

[22] Filed: Jun. 6, 1996

Related U.S. Application Data

[63] Continuation of Ser. No. 388,649, Feb. 13, 1995, abandoned, which is a continuation-in-part of Ser. No. 300,356, Sep. 2, 1994, Pat. No. 5,548,301, which is a continuation of Ser. No. 2,627, Jan. 11, 1993, abandoned.

[51] Int. Cl.[6] .................................................. G09G 3/34
[52] U.S. Cl. ............................. 345/85; 345/100; 345/205
[58] Field of Search .................................. 345/84, 85, 98, 345/99, 100, 94, 205, 206, 56; 348/770, 771; 365/189.02

[56] References Cited

U.S. PATENT DOCUMENTS

| | | |
|---|---|---|
| 4,039,890 | 8/1977 | Bailey et al. . |
| 4,229,732 | 10/1980 | Hartstein et al. . |
| 4,725,832 | 2/1988 | Lorteije et al. ........................ 345/85 |
| 4,741,599 | 5/1988 | Togo et al. ........................... 345/84 |
| 4,954,988 | 9/1990 | Robb ............................... 365/189.02 |
| 4,979,738 | 12/1990 | Frederiksen ........................ 345/132 |
| 5,096,279 | 3/1992 | Hornbeck et al. ................... 348/770 |
| 5,105,288 | 4/1992 | Senda et al. ......................... 345/94 |
| 5,325,106 | 6/1994 | Bahraman ............................ 345/56 |

FOREIGN PATENT DOCUMENTS

| | | |
|---|---|---|
| 4-116628 | 4/1992 | Japan . |
| 92/09064 | 5/1992 | WIPO . |

*Primary Examiner*—Steven Saras
*Attorney, Agent, or Firm*—Julie R. Reed; James C. Kesterson; Richard L. Donaldson

[57] ABSTRACT

An array of individual elements (10) having reduced control circuitry as compared to existing devices. Sets of elements (11) share a memory cell (12), such that each memory cell (12) has the same fanout as other memory cells (12). Each element (11) in a set is switched to an on or off state via a reset line (13) that is separate from that of the other elements (11) in that set. Data is loaded in split bit-frames during a set time period, such that each split bit-frame contains only the data for elements (11) on one reset line (13). Thus, the same memory cell (12) can be used to deliver data to all elements (11) in its fanout because only one element (11) in the fanout is switched at a time.

9 Claims, 3 Drawing Sheets

5,745,088

TIME MULTIPLEXED ADDRESSING CIRCUITRY

RELATED APPLICATION

This application is a Continuation of application Ser. No. 08/388,649 filed Feb. 13, 1995, now abandoned; which is a Continuation In Part of application Ser. No. 08/300,356 filed Sep. 2, 1994, now U.S. Pat. No. 5,548,301; which is a Continuation of application Ser. No. 08/002,627 filed Jan. 11, 1993, now abandoned.

U.S. patent application Ser. No. 08/300,356 filed Sep. 2, 1994.

FIELD OF THE INVENTION

This invention relates to arrays of individually addressable elements, more particularly to circuitry for controlling the addressing of these elements.

BACKGROUND OF THE INVENTION

Arrays of individually addressable elements are used in several areas, from memory cell arrays to spatial light modulators. The arrays typically have an array of individually addressable elements, such as memory cells, or activation circuitry, such as electrodes or diodes. These arrays also typically have a limited time in which to be addressed, either refresh cycles or some other time constraint. Several loading techniques have been developed that allow efficient loading of data into these arrays within the time constraints given.

However, a problem exists in these loading techniques They require at least one memory cell per element. As the number of elements increase, the memory requirements result in increased costs and reduced manufacturing yields. A need exists for an array that has reduced circuitry for controlling the pixel elements.

Loading schemes that use a memory cell for every pixel element also limit the minimum time in which an element can be set, to the time required to load all or part of the data into the array. A need exists for an array addressing circuitry that reduces the data rate.

SUMMARY OF THE INVENTION

A first aspect of the invention is an array having individually controlled elements, each of which may be set and reset depending on a value of a data signal delivered to that element. The array has a number of memory cells, each in data communication with a set of elements. Each memory cell stores a data value of an element of its set and delivers a signal representing this data value to the elements of its set. A number of reset lines are connected to the elements such that a different reset line is in communication with each element of a set. Thus, the reset lines may be used to reset only one element of a set at a time. The elements in the set could be memory cells, activation circuitry for a spatial light modulator, or any type of element capable of receiving a data signal, formed into an array.

A technical advantage of the invention is that a single memory cell controls a set of multiple elements. This reduces the circuitry per element, which has the effect of reducing device cost and increasing manufacturing yields. Also, the peak data rate at which loading must occur is reduced because there are fewer memory cells to load for any one reset. This has the effect of reducing pin-counts and/or lowering data frequency requirements, with the further effect of lower device and/or systems cost.

DETAILED DESCRIPTION OF THE INVENTION

Array Interconnections

Figure 1:
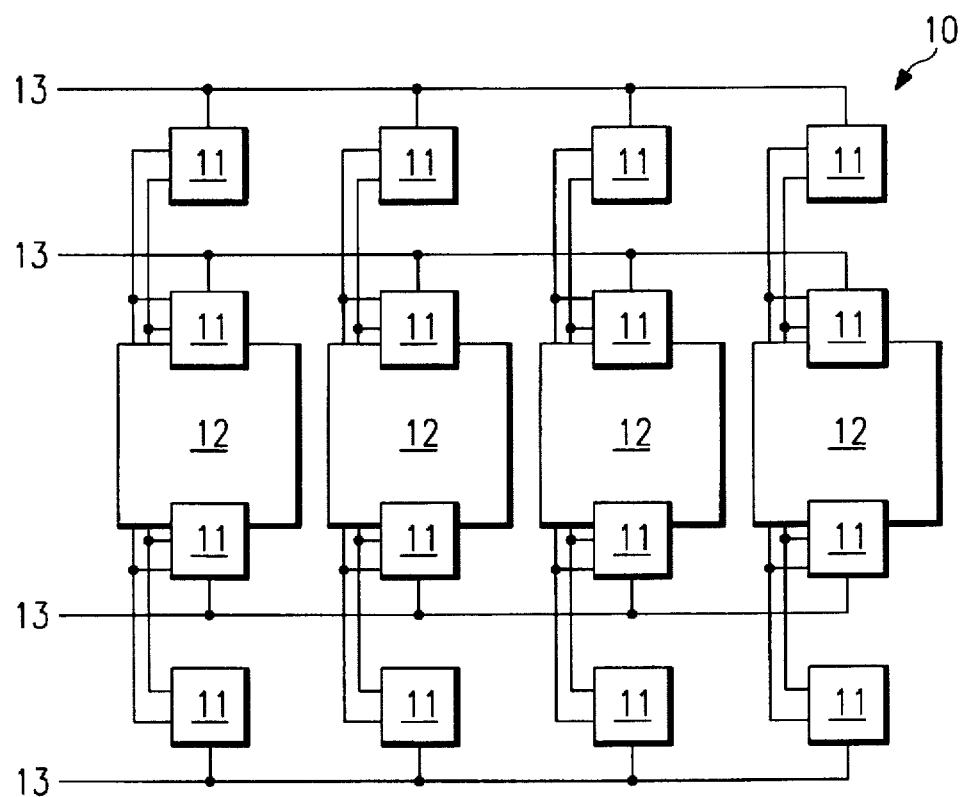
FIG. 1 is a block diagram of a portion of an array, having memory cells with a fanout of four pixel elements.

FIG. 1 is a block diagram of a portion of an array 10, having receiving elements 11 that are controlled with memory cells 12 and reset lines 13. Only a small number of elements 11 with their related control circuitry is shown; a typical array 10 would have thousands of such elements 11. FIG. 1 is primarily intended to show how each memory cell 12 serves multiple elements 11. Additional detail about the interconnections between elements 11, memory cells 12, and reset lines 13 is explained below in connection with FIGS. 2–5.

Array elements 11 are grouped into sets of four elements 11, each set in communication with a memory cell 12. The number of elements 11 in a set associated with a single memory cell 12 is referred to as the "fanout" of that memory cell 12. Thus, in FIG. 1, each memory cell 12 has a "fanout" of four elements. The invention is applicable to other fanout values, but a fanout of four is used herein for purposes of example.

Each memory cell 12 may be a conventional SRAM (static random access memory) cell. One of the advantages of many of today's designs for device 10 is that they may be easily integrated onto underlying CMOS control circuitry. This description is in terms of memory cells 12, each having a single bit storage capacity. However, the scope of the invention could also include "memory cells" that store more than one bit or that have additional logic circuitry. For example, each memory cell 12 could have a double buffer configuration.

Four reset lines 13 control the time when the elements 11 change their state. Once all memory cells 12 for the elements 11 connected to a particular reset line 13 have been loaded, the states of the elements 11 change according to the data with which they have been loaded, simultaneously, in response to a reset signal on that reset line 13. In other words, the elements 11 retain their current state as the data supplied to them from their memory cell 12 changes, and until receiving a reset signal.

Each element 11 in the set of four elements associated with a memory cell 12 is connected to a different one of four reset lines 13. Thus, each element 11 in a set can change its state at a different time from that of the other elements 11 in that set.

In general, each set of elements 11 associated with a memory cell 12 has the same number of elements, and this number is the same as the number of reset lines 13. However, there could be instances, such as on edges of the element array, where a memory cell 12 is connected to a fewer number of elements.

Figure 2:
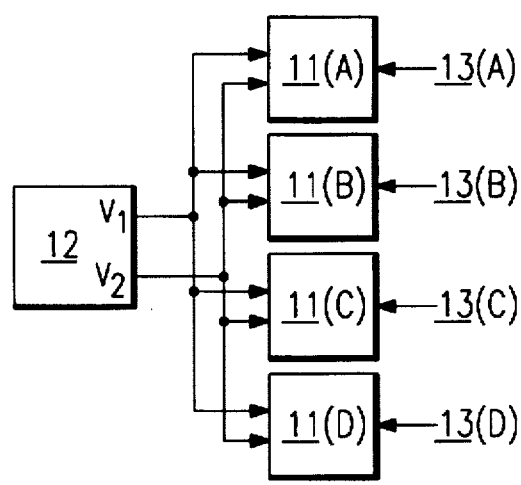
FIG. 2 illustrates a memory cell having a fanout of four pixels.

FIG. 2 illustrates a set of four elements 11, its memory cell 12 and reset lines 13, and the related interconnections. Each element 11 is labeled in terms of the reset line 13 to which it is connected, i.e. element 11(A) is connected to reset line 13(A). As indicated, either a "1" or a "0" value may be delivered to the elements 11. When the memory cell 12 is switched, either of those values is delivered to all elements 11 to which that memory cell 12 is connected. A signal on the reset line 13 of each element 11 determines whether that element 11 will change state.

Figure 3:
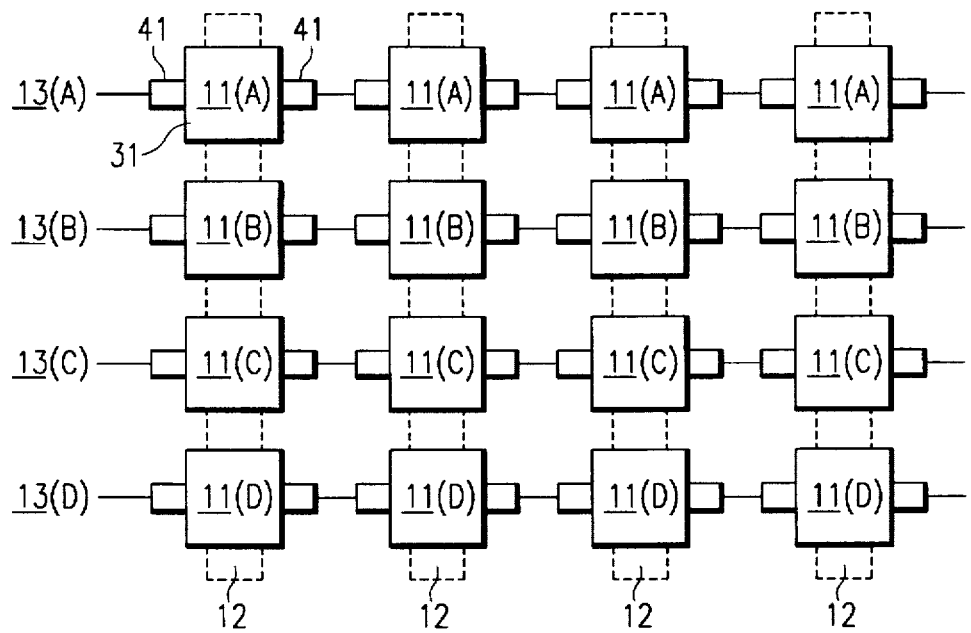
FIGS. 3 and 4 illustrate how reset lines can be easily connected to the address lines of an array of elements.

FIG. 3 is a top plain view of a portion of an array of elements 11, whose reset lines 13 are via torsion hinges 41. As in FIGS. 1 and 2 and as indicated by dotted lines, each element 11 is associated with a memory cell 12 having a fanout of four elements 11. In this embodiment, elements 11 have conductive mirrors 31 and conductive torsion hinges 41 so that the reset can be applied directly to the mirrors 31 via the hinges 41 without special connections or isolations. In FIG. 3, where each mirror 31 has a pair of hinges 41 and where elements 11 are aligned so that the hinges 41 are along horizontal lines, connections to reset lines 13 are easily made along these horizontal lines.

Figure 4:
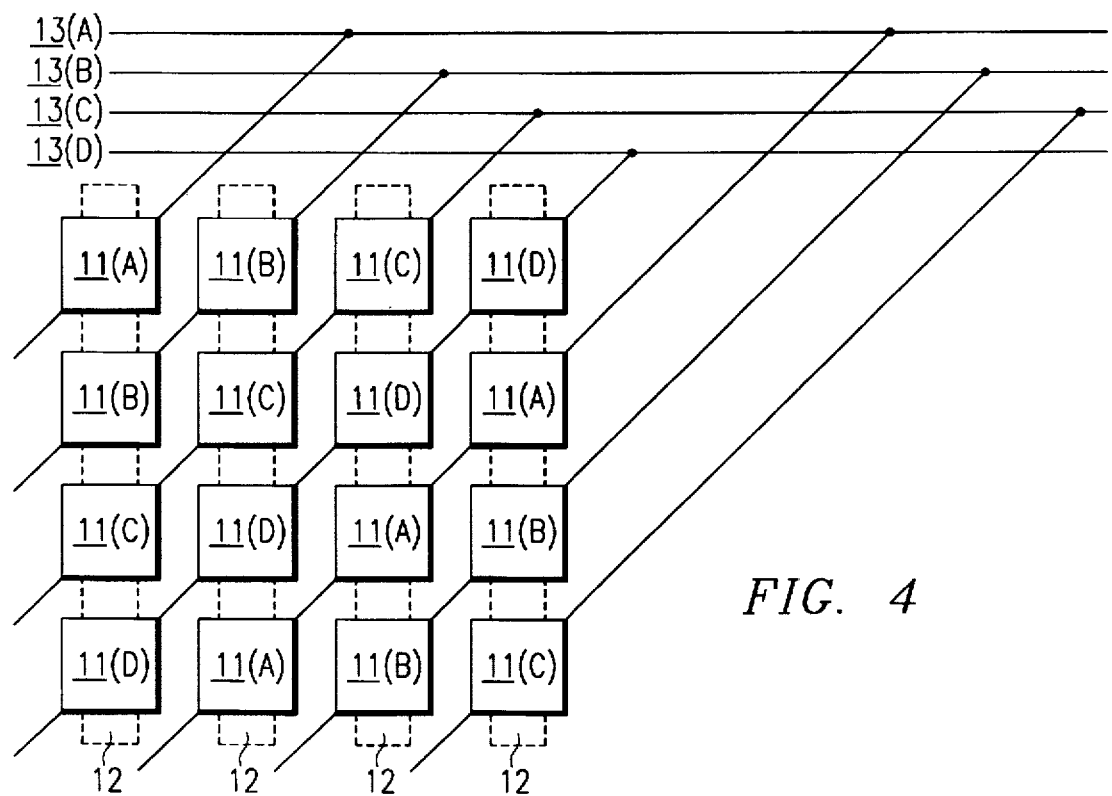

FIG. 4 illustrates an alternative arrangement of device 10. As in FIG. 3, the fanout of each memory cell 12 is a vertically spaced set of elements 11. However, the reset connections are along diagonal reset lines 13. As in FIGS. 2 and 3, each element 11 is labeled in terms of the reset line 13 to which it is connected, i.e. element 11(A) is connected to reset line 13(A). This arrangement would be useful in SLMs 10 where it is advantageous to align elements 11 such that their hinges 41 are along diagonal lines.

Operation of the Invention

One embodiment that is particularly useful for demonstrating the operation of the invention is one utilizing the address circuitry for a spatial light modulator. For pulse width modulation, the operation of device 10 is generally consistent with existing pulse width modulation techniques in that an n-bit value represents the brightness of each element 11 during a frame period. Each bit of the n-bit value represents a time during which the element 11 is either on or off. The number of bits in the n-bit value is referred to herein as the "bit depth".

For purposes of example herein, it is assumed that each element 11 displays light during one frame in accordance with a bit depth of 5 bits. Thus, for example four elements 11 in a set associated with a single memory cell 12 might have the following data for a single frame:

1 A B C D E
2 F G H I J
3 K L M N O
4 P Q R S T, where {ABCDE} represents a 5-bit binary value. The value of each bit is "1" or "0" representing one of two possible states for the element 11.

If it is assumed that a "1" in the LSB position represents an "on" value of one time unit, then a "1" in the MSB position will represents 16 time units, with the intermediate bits ranging downward as requiring 8, 4, and 2 time units. If bit 4 is the MSB, and bit 0 is the LSB, the times represented by each a "1" value of bit are:

| bit 4 (MSB) | 16 time units |
| bit 3 | 8 time units |
| bit 2 | 4 time units |
| bit 1 | 2 time units |
| bit 0 (LSB) | 1 time unit |

Thus, the greater the 5-bit value, the longer the element 11 is on during a frame, and the brighter it is relative to other elements 11 during that frame.

Further details about pulse width modulation techniques are described in U.S. patent Ser. No. 07/678,761, referred to in the background section of this patent application and incorporated herein by reference.

The pulse width modulation technique described herein makes use of the fact that some on or off times are long compared to the switching speed capability of memory cells 12. An underlying premise of the invention is that a single memory cell 12 may serve multiple elements 11 if its data loading is sequenced so that no more than one of its elements 11 needs resetting at the same time.

In general, the sequencing used to load each frame of data depends on fanout and the bit-depth. Various sequences are possible, but a rule that the sequencing must follow is that no two elements 11 in a set can need loading at the same time.

Several "optional" rules, in addition to the rule of the preceding paragraph, may be applied. Where a fanout of m elements is assumed, one such rule is that at the beginning of the sequence, all m elements 11 are loaded in the first m time units. Thus, each element 11 of each set is loaded in a continuous series of initial time slices. This rule results in good separation between frames, with a maximum skew of m time units between the end of one frame and the beginning of the next. Also, the data loaded during the first m−1 time slices should not be the LSB data. Finally, the data for any one element 11 should begin and end in the same position relative to a frame. This is true because for a bit depth of n bits, the number of data units used for loading data is $2^n-1$ data units.

Figure 5:
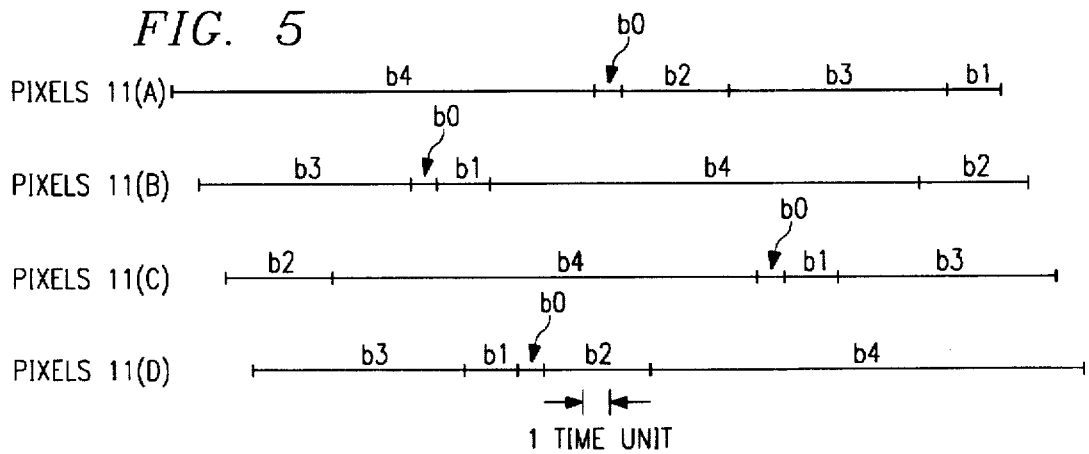
FIG. 5 is an example of a data sequence for loading a frame of data into an array of memory cells, each having a fanout of four pixel elements.

FIG. 5 illustrates an example of data sequencing for a memory cell 12 having a fanout of four, and applying all of the above rules. Thus, where m=4, and it is assumed that each loading step takes one time unit, the four elements 11 associated with a memory cell 12 are loaded with the same data but only one element 11 is reset. The elements associated with a first reset line 13(A) are designated as elements 11 (A), etc.

The loading sequence of FIG. 5 is for 5-bit data frames as follows:

Load pixels 11(A), bit 4, and reset 13(A)
Load pixels 11(B), bit 3, and reset 13(B)
Load pixels 11(C), bit 2, and reset 13(C)
Load pixels 11(D), bit 3, and reset 13(D)
Skip 2 LSB time units
Load pixels 11(C), bit 4, and reset 13(C)
Skip 2 LSB time units
Load pixels 11(B), bit 0, and reset 13(B)
Load pixels 11(B), bit 1, and reset 13(B)
Load pixels 11(D), bit 1, and reset 13(D)
Load pixels 11(B), bit 4, and reset 13(B)
Load pixels 11(D), bit 0, and reset 13(D)
Load pixels 11(D), bit 2, and reset 13(D)
Skip 1 LSB time unit
Load pixels 11(A), bit 0, and reset 13(A)
Load pixels 11(A), bit 2, and reset 13(A)
Load pixels 11(D), bit 4, and reset 13(D)
Skip 2 LSB time units
Load pixels 11(A), bit 3, and reset 13(A)
Load pixels 11(C), bit 0, and reset 13(C)
Load pixels 11(C), bit 1, and reset 13(C)
Skip 1 LSB time unit
Load pixels 11(C), bit 3, and reset 13(C)
Skip 2 LSB time units
Load pixels 11(B), bit 2, and reset 13(B)

Load pixels 11(A), bit 1, and reset 13(A)

Skip 1 LSB time unit

Buffering with a frame buffer (not shown) may be used to order the data in the correct sequence. A frame of data (the data that fills an array of device 10) is divided into four "split bit-frames". For the first split bit-frame, bit 4 for each element 11(A) in each set associated with memory cells 12 would be appropriately ordered for loading during a time unit, such that ¼ of the device 10 is loaded. Then, all bit 3's for each element 11(B) would be ordered as a second split bit-frame for loading, etc.

The overall effect of the data sequencing is that, for each frame, the entire array of elements 11 is reset in groups of pixels, rather than all at once. Thus, resetting occurs in a "split reset" pattern, i.e., those elements 11 connected to a single reset line 13 are switched at the same time. The addressing and reset is performed in a time multiplexed manner.

Like prior pulse width modulation techniques, it takes $2^n-1$ LSB time units to display a full n-bit frame. However, each loading step is done with smaller increments of memory and can therefor be done in less time. In the example of this description, ¼ of a bit-frame is loaded for every reset signal. In other words, four reset signals are used per bit-frame. Each bit-frame, unlike those of prior pulse width modulation techniques, may display data from a different bit.

As a result of the loading technique of the invention, the peak data rate is reduced. Also, although loading occurs more frequently per frame, the higher valued bits no longer coincide for all elements 11. Thus, there are no long waits during the display time of these higher valued bits. The average data rate and the peak data rate more closely converge. This technique can also be used to address array of elements that can store data. For example, the elements could be individual memory cells for storage, addressed by an memory cell for transferring the data into the appropriate cell.

The maximum fanout per memory cell 12 depends on the bit depth. Where the bit depth is n, the theoretical maximum fanout may be calculated as:

$$fanout_{max} = \frac{2^n - 1}{n}$$

The numerator of the above equation represents that there are $2^n-1$ time slices per frame. The denominator indicates that each fanout requires n events.

Computer programs may be developed and used to determine appropriate sequences for varying bit depths and fanouts. A rule-based program will prevent violations of the above-stated rule that prohibits more than one element 11 in a set from needing resetting at one time, as well as other optional rules.

An enhanced method of the invention combines the above-described "split reset" process with a "block clearing". Block clearing has been used with prior pulse width modulation schemes to avoid the problem of having to load an entire bit-frame during a LSB time unit. For block clearing, bit-frames are loaded in whole multiples of a LSB time unit. A mechanism is provided on the device 10 to allow all elements 11 to be quickly "cleared", i.e., switched to an "off" state. Thus, those bit-frames whose "on" times are less than the time required for loading can be given their appropriate weight. The total number of time units in a frame exceeds the maximum brightness time by the number of time units used for clearing. Thus, the consequence of having elements 11 in an "off" state during part of loading is a reduction in optical efficiency of the device 10. The general aspects of block clearing are described in U.S. Ser. No. 07/678,761.

Fault Tolerance

Figure 6:
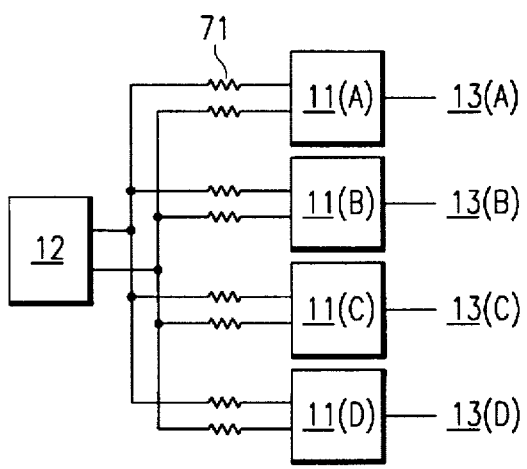
FIGS. 6–8 illustrate enhanced embodiments for providing improved fault tolerance.

FIG. 6 illustrates an enhancement of the device 10 of FIGS. 1–5, especially with respect to the interconnections between each memory cell 12 and the elements 11 in its fanout. A resistive element, in this case a resistor 71, is included in each data connection for reducing the impact of a failure at any one element 11. For example, a short at one of the elements 11 will not cause the rest of the elements 11 in the set to fail.

As stated above, a feature of many SLMs 10 is that they are easily fabricated using integrated circuit processes. In these types of SLMs 10, resistors 71 could be fabricated from a polysilicon material. Alternatively, a highly resistive material could be used for the electrode contacts. Also, as an alternative to extra resistive areas or elements, the entire fabrication level for element electrodes, such as the electrodes 33 of FIG. 3, could be made from a material, such as titanium nitride or titanium oxynitride, having a high sheet resistance.

Figure 7:
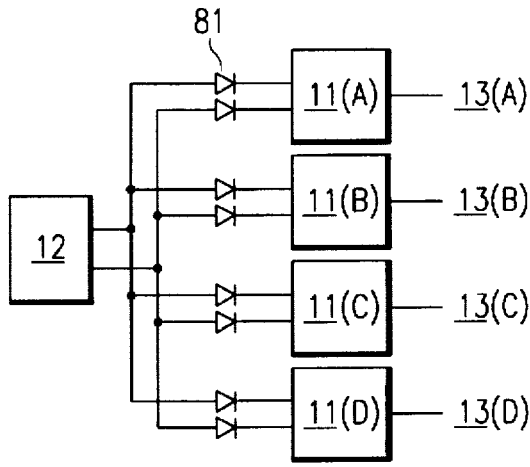

FIG. 7 illustrates another fault-tolerant enhancement of device 10. Instead of resistors 71, diodes 81 are used as a resistive element to isolate a fault at any one element 11.

Figure 8:
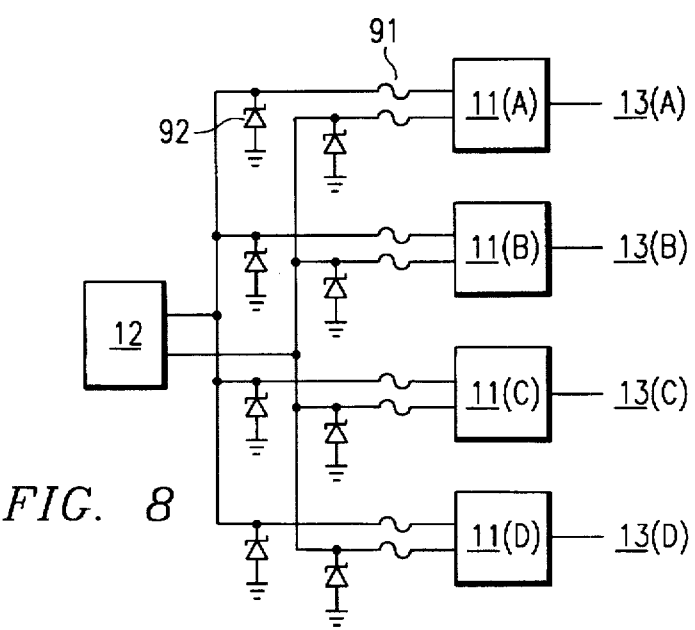

FIG. 8 illustrates a third fault-tolerant enhancement. Fuses 91 are designed to "blow" if there is a shorted element 11. Zener diodes 92 or some other type of breakdown diode provides a high resistance to ground.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A spatial light modulator, comprising:

an array of receiving elements, each of which may be individually set or reset to either of two states depending on a value of a data signal delivered to that element, from an associated memory cell;

a number of memory cells, each directly connected to a unique and predetermined set of elements of said array, such that each said memory cell stores data for each of said receiving elements in its set and communicates those data values to said receiving elements in its set; and a number of reset lines, connected to said receiving elements such that a different reset line is in communication with each element of a set of elements wherein said receiving elements have conductive torsion hinges and said reset lines are connected via said hinges.

2. The spatial light modulator of claim 1, wherein each set of receiving elements comprises four elements.

3. The spatial light modulator of claim 1, wherein said receiving elements are micro-mechanical mirror elements.

4. The spatial light modulator of claim 1, wherein said receiving elements have conductive mirrors and said reset lines are connected directly to said mirrors.

5. The spatial light modulator of claim 1, wherein said hinges are aligned in horizontal rows.

6. The spatial light modulator of claim 1, wherein said hinges are aligned in diagonal lines.

7. The spatial light modulator of claim 1, wherein each of said receiving elements has a pair of address electrodes for delivering said data signal, and further comprising a resistive element between the address electrodes of a element and the memory cell associated with that element, for isolating said element in the event of a element fault.

8. The spatial light modulator of claim 1, wherein each of said receiving elements has a pair of address electrodes made from a highly resistive material for isolating said element in the event of a element fault.

9. The spatial light modulator of claim 8, wherein said spatial light modulator is fabricated above an integrated circuit array of said memory cells.

* * * * *